Sept. 7, 1943. C. E. WIESSNER 2,328,698
PRESSURE SYSTEM FOR LIQUID SEAL SHAFT PACKINGS AND THE LIKE
Filed Jan. 6, 1941
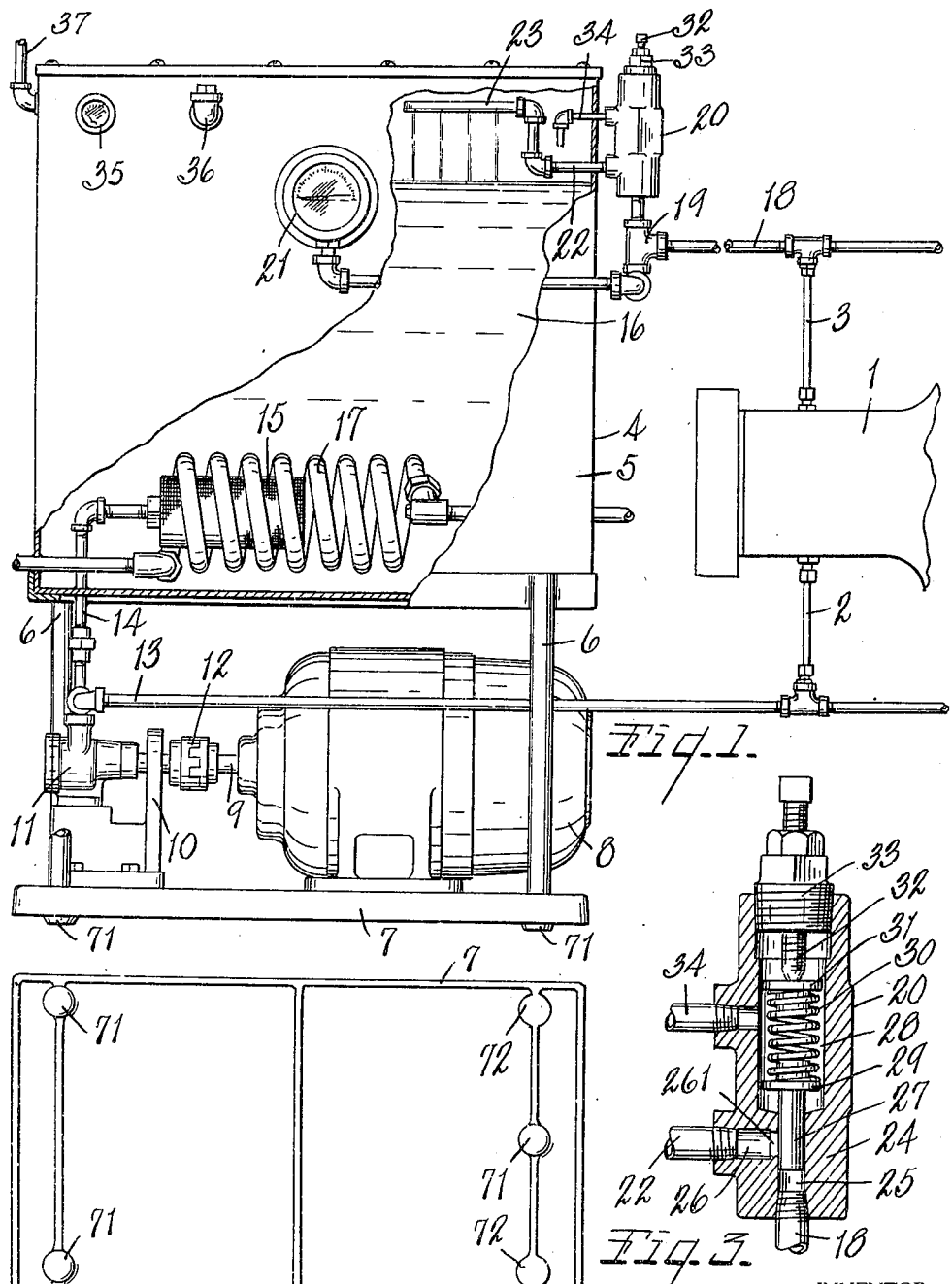
INVENTOR.
Christopher Wiessner
BY
Earl D. Chappell
ATTORNEYS Patented Sept. 7, 1943

2,328,698

UNITED STATES PATENT OFFICE 2,328,698

PRESSURE SYSTEM FOR LIQUID SEAL SHAFT PACKINGS AND THE LIKE

Christopher E. Wiessner, Kalamazoo, Mich., assignor to Durametallic Corporation, Kalamazoo, Mich., a corporation of Michigan Application January 6, 1941, Serial No. 373,286

6 Claims. (Cl. 286—19)

This invention relates to improvements in pressure systems for liquid seal shaft packings and the like.

The main objects of this invention are:

First, to provide an improved and highly efficient pressure system for circulating lubricating oil, especially to supply oil to a liquid sealed shaft packing or equivalent structure, which system is adapted to develop extremely high liquid pressure suitable for sealing the shafts of pumps and the like operating at high output pressures, and for other purposes.

Second, to provide a circulating system of the type described which is exceedingly compact and entirely self-contained, and is fabricated of parts which are strong and rigid to resist wracking and resultant unsatisfactory operation.

Third, to provide a system of the type described including a liquid pressure regulating valve of improved design which greatly extends the pressure range or capacity of the system as a whole and adapts the same for sealing the shafts of pumps operating in a wide range of pressures, or for circulating oil to bearings, or in any application where it is desired to supply oil at a uniform pressure.

Fourth, to provide a continuous system of the type described wherein the pressure liquid is circulated to one or a plurality of pumps or other devices to supply liquid to hydraulic shaft, rod or stem sealing devices associated therewith, thence through a pressure controlling device to a tank or container for cooling, straining, and the like, and wherein exceedingly high liquid pressure may be produced so as to enable an effective liquid seal to be provided throughout a wide range of pressures.

Objects relating to details and economies of the invention will appear from the description to follow. The invention is defined of the claims.

A structure embodying the features of the invention is illustrated in the accompanying drawing, wherein:

Fig. 1 is a fragmentary view illustrating a pressure system in accordance with my invention in association with the packing box of a pump or like mechanism, certain of the structure being broken away to illustrate enclosed devices or details thereof.

Fig. 2 is a bottom plan view illustrating the construction of the floor or support engaging base provided for the parts of the system.

Fig. 3 is an enlarged fragmentary view in vertical section illustrating an improved pressure regulating valve incorporated in the system.

The present invention relates to pressure systems for supplying liquid such as oil to a hydraulic seal such as is employed for sealing the shafts of pumps and other apparatus such as are employed in refineries, chemical plants, and the like. As such it is a self-contained one in its entirety, being furnished as a single unit which can be associated in a very simple manner with any liquid sealed apparatus. Alternatively, the system may be employed to circulate oil through large bearings, supply oil used as actuating medium for hydraulic equipment, furnish oil for heat treating apparatus, or in any other application where a problem of circulating or supplying liquid at uniform pressures is presented. The present system, moreover, is characterized by an extremely wide range of operating pressures so as to further widen the field of use of the same. It may be used in connection with practically any hydraulic seal and, moreover, enables hydraulic seals to be employed on pumps and similar mechanisms in cases where a hydraulic seal has hitherto been impractical by reason of the extremely high discharge pressure of the particular pump.

Referring to the drawing, in the preferred adaptation of my invention illustrated, the reference numeral 1 in general indicates a pump or other liquid handling apparatus having feed and return service pipes 2, 3 respectively connected to the stuffing box thereof for circulating a liquid sealing agent through a hydraulic seal device of any suitable design (not shown) associated with a stuffing box. Similar service lines will be employed in other applications of the system here disclosed. This liquid sealing agent, preferably oil, is supplied by the circulating pressure system of my invention which is generally indicated by the reference numeral 4.

The system 4 includes a liquid tank 5 of suitable capacity which is supported by standards 6 on a strong ribbed cast iron base 7. Mounted on this base is a prime mover such as an explosion-proof motor 8 the shaft 9 of which is supported on a suitable ball bearing device 10 and connected to the shaft of a pump 11. Reference numeral 12 designates a suitable coupling connecting the motor and pump shafts.

Referring to Fig. 2, wherein I have illustrated the bottom construction of base 7, it will be noted that the latter is provided with three bosses 7I serving as feet or supports for the base, whereby the latter is mounted on any surface, even or uneven, without any likelihood of canting or wracking. This provision is of substantial importance, inasmuch as any such wracking or skewing tendency would affect the alinement of motor shaft 9 and the shaft of pump 11, thereby resulting in destructive wear and unsatisfactory operation. The portions of the base indicated by the reference numeral 12 do not extend beneath the skirt of the base.

Pump 11 is a rotary positive displacement pump having the discharge service thereof connected through a pipe 13 and suitable connecting fittings to the feed line 2 for the packing seal and the suction or intake thereof communicating through a conduit 14 with a filter 15 disposed in tank 5 from which sealing liquid 16 is supplied to the pump.

The filter 15 acts to prevent foreign particles such as grit or scale from entering the pump. A cooling coil 17 is installed in the tank, through which cooling liquid such as cold water or brine is circulated to reduce the temperature of the liquid entering the pump 11. This cooling coil 17 may, but does not necessarily, surround the filter 15. It will be appreciated that under the exceedingly high pressures developed in the system of my invention and with the liquid friction involved the sealing liquid becomes heated and it is desirable to cool the same prior to recirculating through the hydraulic seal. This maintains the liquid at uniform viscosity.

The return service pipe 3 for the stuffing box of the apparatus 1 is connected by a pipe 18 through a branched or T-fitting 19 with a pressure regulator device 20 to be described. Pipe 18 is communicated through the other branch of fitting 19 with a pressure gauge 21. Leaving the regulator 20, the sealing liquid is returned to the tank through a conduit 22 and a suitable baffle element 23 which directs the liquid back in streams to the supply in the tank. By reason of the fact that the regulator 20 to be described is of a type enabling liquids at extremely high pressures to be handled and inasmuch as the liquid passes through the regulator 20 through a relatively restricted space, with resultant likelihood of foam arising, it is highly desirable that some such appropriate baffling provisions be provided so as to prevent any foamy condition of the liquid. I have not specifically illustrated such features, inasmuch as appropriate provisions will occur to those skilled in the art.

Referring to Fig. 3, wherein the construction of the pressure regulator 20 is illustrated in detail, the reference numeral 24 specifically indicates a housing or casing into the bottom of which the return service pipe 18 is tapped in communication with a vertical passage or bore 25. A lateral passage 26 in the casing communicates with bore 25 and has the discharge pipe 22 tapped therein. It should be noted that passages 26 and 25 communicate through a restricted opening which may be in the form of a narrow vertical slot 261 in the former and which greatly restricts the discharge capacity of the regulator and makes possible a very accurate pressure adjustment. The shape of this slot or opening may vary, but in the illustrated embodiment the parallel vertical sides thereof are spaced a distance of $\tfrac{3}{32}$ to $\tfrac{1}{16}$ inch and are of slightly less vertical dimension than the passage 26.

Bore 25 slidably receives with an exceedingly small clearance a plunger 27 which extends upwardly into a chamber 28 above the bore and is provided with a head or shoulder 29 against which a strong coiled compression spring 30 abuts. At its other end the spring 30 abuts a thrust or abutment plate 31 which is adjustably engaged and held fixed by means of a manually regulated adjusting screw 32 which is threaded in a top closure or plug 33 for the casing. The last named closure is threaded on the casing. A drain pipe or bleeder 34 communicating with chamber 28 is provided to vent excess liquid from the chamber into the tank 5.

The regulating screw 32 may be readily adjusted manually to regulate the pressure exerted by spring 30 for any given installation. This screw determines the range of pressures which can be developed in the system. As stated, plunger 27 has a close fit in the bore 25 so that there is very little leakage therepast and in operation it yields under the pressure of fluid entering the regulator from pipe 18. A regulator of this type enables a positive displacement pump to be employed for creating extremely high pressure without likelihood of rupturing any of the parts due to sticking or jamming of the pressure regulator structure. It assures maintenance of circulation with an absolute minimum of pressure fluctuation and a very precise pressure regulation.

As illustrated in Fig. 1, the service pipes or conduits 13, 18 may be extended as desired to adapt the system of my invention for supplying sealing liquid to both ends of the pump 1 or, in fact, to any number of pumps or other devices to which it is desired to supply oil at a uniform pressure.

In Fig. 1, the reference numeral 35 indicates a suitable liquid level gauge and the reference numeral 36 a filler port. The lid of the tank is gasketed so that the system is vapor-proof and a vent outlet 37 is provided for relieving the system of vapors and vapor pressure without removing the tank lid. This feature is of distinct importance in systems of this type.

I have illustrated and described my improvements in an embodiment which is very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent is:

1. A self-contained pressure system for circulating liquid at uniform pressure, comprising a hydraulic shaft seal through which the liquid is circulated, a liquid supply tank, a positive displacement rotary pump having its intake in communication with the contents of said tank through a filter, a prime mover connected to said pump to drive the same, a strong distortion resistant base supporting said tank, pump and prime mover as a unit, a cooling coil associated with said filter for cooling the liquid prior to entering the pump, the discharge of said pump being in communication with said seal, a liquid return line communicated with said seal having a flow obstructing and resisting pressure regulator therein discharging through a discharge conduit into said tank, said pressure regulator comprising a casing having a passage communicating said conduit and said return line on the intake side of the regulator, a plunger in said casing slidable in said passage with extremely small clearance and provided with a head at one end thereof, said casing having an enlarged chamber receiving said head, an adjustable abutment in said casing, and a coil compression spring interposed between said abutment and the head of said plunger whereby to resist movement of the plunger by liquid acting thereon in said passage, said plunger yielding to said pressure in opposition to said spring whereby liquid is discharged through said conduit to the tank, and a baffle device associated with said conduit to prevent foaming in the liquid incident to discharge thereof from said regulator under high pressures.

2. A self-contained pressure system for circulating liquid at uniform pressure, comprising a hydraulic shaft seal through which the liquid is circulated, a liquid supply tank, a positive displacement rotary pump having its intake in communication with the contents of said tank, a prime mover connected to said pump to drive the same, a strong distortion resistant base supporting said tank, pump and prime mover as a unit, the discharge of said pump being in communication with said seal, a liquid return line communicated with said seal having a flow obstructing and resisting pressure regulator therein discharging through a discharge conduit into said tank, said pressure regulator comprising a casing having a passage communicating said conduit and said return line on the intake side of the regulator, a plunger in said casing slidable in said passage with extremely small clearance, an adjustable abutment in said casing, and a coil compression spring interposed between said abutment and said plunger whereby to resist movement of the plunger by liquid acting thereon in said passage, said plunger yielding to said pressure in opposition to said spring whereby liquid is discharged through said conduit to the tank, and a baffle device associated with said conduit to prevent foaming in the liquid incident to discharge thereof from said regulator under high pressures.

3. A self-contained unitary pressure system for circulating liquid at uniform pressure, comprising a hydraulic shaft seal, a liquid supply tank, a positive displacement pump having its intake in communication with the interior of said tank, a prime mover alined with and connected to said pump by a coupling to drive the same, a rigid reinforced base supporting said tank, pump and prime mover as a unit without distortion likely to destroy alinement of the pump and prime mover, a cooling coil adjacent the pump intake for cooling the liquid so as to insure uniform viscosity prior to entering the pump, the discharge of said pump being in communication with said seal, a liquid return line communicated with said seal having a flow obstructing and resisting pressure regulator therein discharging to said tank through a restricted orifice, and a baffle device on the discharge side of the regulator to prevent foaming in the liquid incident to operation of said regulator under high pressures.

4. A unitary pressure system of the type described comprising a supply of liquid, a positive displacement pump having its intake connected to said supply, a prime mover therefor, and means for circulating liquid to and from the supply and pump respectively including a supply service line connected to the discharge of the pump and a return service line including a conduit discharging into said supply, a hydraulic device to which said supply and return lines are connected to complete a path of circulation therethrough, said return line having a flow obstructing and resisting pressure regulator therein, comprising a casing having a fluid passage in communication with said line, a plunger slidable in said passage with very small clearance, a normally fixed adjustable abutment in said casing, and a spring coacting with said abutment and plunger to resist movement of the latter under pressure exerted thereon in said passage, the tension of said spring being regulable by adjustment of said abutment to vary the pressure of the circulating liquid, said plunger yielding under said pressure to compress said spring, said conduit of the return line communicating with said passage through a restricted opening whereby a fine adjustment of the pressure may be had and having a baffle therein for preventing foaming in the liquid incident to operation of the regulator under high pressure.

5. A unitary pressure system of the type described comprising a supply of liquid, a positive displacement pump having its intake connected to said supply, a prime mover therefor, and means for circulating liquid to and from the supply and pump respectively including a supply service line connected to the discharge of the pump and a return service line including a conduit discharging into said supply, a hydraulic device to which said supply and return lines are connected to complete a path of circulation therethrough, said return line having a pressure regulator therein of a yieldably biased plunger, flow-obstructing type, said conduit of the return line communicating with said regulator through a restricted opening and having a baffle therein for preventing foaming in the liquid incident to operation of the regulator under high pressure.

6. A unitary pressure system of the type described comprising a supply of liquid, a positive displacement pump having its intake connected to said supply, a prime mover therefor, and means for circulating liquid to and from the supply and pump respectively including a supply service line connected to the discharge of the pump and a return service line including a conduit discharging into said supply, a hydraulic device to which said supply and return lines are connected to complete a path of circulation therethrough, said return line having a flow obstructing and resisting pressure regulator therein, comprising a casing having a fluid passage in communication with said line, a plunger slidable in said passage with very small clearance, a normally fixed adjustable abutment in said casing, and a spring coacting with said abutment and plunger to resist movement of the latter under pressure exerted thereon in said passage, the tension of said spring being regulable by adjustment of said abutment to vary the pressure of the circulating liquid, said plunger yielding under said pressure to compress said spring, said conduit of the return line communicating with said passage through a restricted opening whereby a fine adjustment of the pressure may be had.

CHRISTOPHER E. WIESSNER.